United States Patent Office 3,642,919
Patented Feb. 15, 1972

3,642,919
PREPARATION OF 1,4-DICHLOROBUTENE-2
Giovanni A. Bonnetti, Wynnewood, Thomas N. Baker III, Philadelphia, and Eugene C. Capaldi, Broomall, Pa., assignors to Atlantic Richfield Company, New York, N.Y.
No Drawing. Filed Nov. 13, 1969, Ser. No. 876,603
Int. Cl. C07c 21/04
U.S. Cl. 260—654
6 Claims

ABSTRACT OF THE DISCLOSURE

Reacting 3,4-epoxybutene-1 with hydrochloric acid and cuprous chloride to produce 1,4-dichlorobutene-2. In another embodiment the 3,4-epoxybutene-1 is first hydrolyzed to a mixture of the 2-butene-1,4-diol and erythrol (1-butene-3,4-diol). These compounds can be reacted with the hydrochloric acid and cuprous chloride to produce the 1,4-dichlorobutene-2. The 1,4-dichlorobutene-2 is a useful intermediate in the production of various monomers.

BACKGROUND OF THE INVENTION

Field of the invention

This invention relates to a method for the conversion of 3,4-epoxybutene-1 into 1,4-dichlorobutene-2 by the use of hydrochloric acid and cuprous chloride at ordinary temperatures and pressures. In one specific embodiment the 3,4-epoxybutene-1 is first hydrolyzed to a mixture of the diols which can then be reacted with the hydrochloric acid and cuprous chloride to produce the 3,4-dichlorobutene-2.

Prior art

Recently a method has been developed commercially for the epoxidation of olefins which utilizes an organic hydroperoxide as the oxidizing agent and a molybdenum-containing catalyst which can be any one of a very wide variety of inorganic or organic molybdenum compounds. When butadiene is epoxidized by this process there is produced the butadiene monoepoxide, i.e. 3,4-epoxybutene-1 together with only small amounts of the diepoxide. Other prior art epoxidation methods also produce the monoepoxide predominantly. When the 3,4-epoxybutene-1 is hydrolyzed by conventional methods such as under acidic conditions there is produced a mixture of erythrol (1-butene-3,4-diol) and the 2-butene-1,4-diol. The various aqueous acid solutions which can be used include inorganic acids such as sulfuric, hydrochloric, $HBF_4$, and the like and the organic acids such as acetic, benzoic, formic and the like. Since the 1,4-diol can be dehydrated with ring closure by the use of para-toluene sulfonic acid, for example, to produce furan it was desirable to find means of obtaining the 1,4-diol in high yields.

In accordance with this invention it was found that either the 3,4-epoxybutene-1 or the erythrol produced by the hydrolysis of the 3,4-epoxybutene-1 can be converted to the 1,4-dichlorobutene-2, which compound in turn by hydrolysis can be converted into the desired 2-butene-1,4-diol, the precursor for furan. In addition, the 1,4-dichlorobutene-2 is an intermediate in the production of a large number of useful monomers.

SUMMARY OF THE INVENTION

In accordance with this invention the monoepoxide of butadiene, i.e. 3,4-epoxybutene-1 is reacted preferably with concentrated hydrochloric acid and anhydrous cuprous chloride at ambient temperatures and pressures and preferably with a mole ratio of hydrochloric acid to epoxide of at least 2:1 to produce 1,4-dichlorobutene-2.

In another embodiment of the invention the 3,4-epoxybutene-1 is first hydrolyzed to a mixture of the diols and the erythrol isomer is separated by fractional distillation and after separation is converted to the 1,4-dichlorobutene-2 with the hydrochloric acid-cuprous chloride reaction. The 1,4-dichlorobutene-2 can be converted to the 1,4-diol and this can be combined with the 1,4-diol produced by the first hydrolysis step. Thereafter the furan can be produced by ring closure accompanied by dehydration of the 1,4-diol.

It is an object of this invention therefore to provide a method for the preparation of 1,4-dichlorobutene-2.

It is another object of this invention to provide a method for the preparation of 1,4-dichlorobutene-2 from 3,4-epoxybutene-1.

It is another object of this invention to provide a method for the preparation of 3,4-dichlorobutene-2 from erythrol.

Other objects of this invention will be apparent from the following description of the preferred embodiments and from the claims.

DESCRIPTION OF THE PREFERRED EMBODIMENTS

The butadiene monoepoxide (3,4-epoxybutene-1) is obtainable by any conventional epoxidation process, one of which has been mentioned, i.e. the use of an organic hydroperoxide oxidizing agent such as tertiary butyl hydroperoxide in the presence of a molybdenum-containing catalyst.

In carrying out the reaction with hydrochloric acid and cuprous chloride it is preferred that concentrated hydrochloric acid be employed and anhydrous cuprous chloride. Although dilute solutions of hydrochloric acid can be used they are not preferred since they give lower yields of the dichloride and also give undesirable side reactions. The mole ratio of the hydrochloric acid, i.e. the HCl, to the monoepoxide should be at least 2:1 and is preferably in excess of this amount, i.e. up to 10:1. A mole ratio in the range of from 3:1 to 6:1 is satisfactory. The amount of anhydrous cuprous chloride employed is not critical, catalytic amounts being satisfactory Although 1 gram of the anhydrous cuprous chloride per 100 ml. of concentrated hydrochloric acid is convenient, amounts ranging from 0.01 gram to 2 grams per 100 ml. of hydrochloric acid is a satisfactory range. The reaction can be carried out at ambient temperatures although it is preferable to mix the reactants at a low temperature, for example, −5° C. to 0° C. and after complete mixing at this temperature the temperature can be allowed to increase to room temperature. Thus a range of from −5° C. to 30° C. is a satisfactory range with a preferred range being from 0° C. to 25° C. In general the starting material should be added slowly to the hydrochloric acid-cuprous chloride solution and if necessary cooling should be employed to prevent excessive temperature rise. The reaction is preferably carried out at atmospheric pressure, purely for convenience. Reaction times ranging from ½ hour to 48 hours can be employed depending upon the temperature and the degree of agitation of the reactants. Times ranging from 1 to 10 hours in the preferred reaction temperature range with vigorous agitation are generally sufficient.

The products of the reaction are recovered from the reaction mixture preferably by extraction with diethyl ether followed by fractional distillation to obtain the individual components. In general, if the 3,4-epoxybutene-1 is first hydrolyzed to the diol mixture, the erythrol can be separated by fractionation and reacted in the same manner under the same conditions as for the epoxide to produce the desired 1,4-dichloro-butene-2. The mole ratio of hydrochloric acid (HCl) to erythrol is also at least 2:1 and preferably in excess of this ratio, i.e. up to 10:1. Alternatively, the entire diol mixture from the hydrolysis can be reacted with the hydrochloric acid and the anhydrous cuprous chloride to produce the 1,4-dichlorobutene-2 likewise utilizing the same conditions as described for the conversion of the epoxide.

The examples which follow are provided to illustrate various methods of carrying out the invention.

EXAMPLE I

To a stirred solution of 10.0 ml. of concentrated hydrochloric acid and 0.1 gram of cuprous chloride at 20–25° C. was added 2.0 grams of 3,4-epoxybutene-1. The epoxide was added slowly with cooling to prevent undue temperature rise and after addition the mixture was stirred at room temperature, i.e. about 25° C. for 2 hours. The reaction mixture was then continuously extracted with diethyl ether for several hours following which the extract was distilled to give a 79 weight percent yield of dichlorobutenes consisting of 88 weight percent of the 1,4-dichlorobutene-2 isomer and 12 weight percent of the 1,2-dichlorobutene-3. The isomers were determined by chromatographic adsorption methods but commercially they can be separated by fractional distillation since their boiling points differ by about 30° C.

EXAMPLE II

There was added to a stirred solution of 100 ml. of concentrated hydrochloric acid and 1.0 gram of anhydrous cuprous chloride cooled to 0° C. 12.95 grams (0.147 mole) of 1-butene-3,4-diol, i.e. erythrol obained by the acid hydrolysis of the 3,4-epoxybutene-1. The addition required 30 minutes. Following the addition the temperature was increased to room temperature and the reaction mixture was stirred for approximately 16 hours and then it was continuously extracted with diethyl ether for 48 hours. The extract was distilled and a 94 weight percent yield of dichlorobutenes was obtained of which 84 weight percent was 1,4-dichlorobutene-2 and 16 weight percent was 1,2-dichlorobutene-3.

EXAMPLE III

The 2-butene-1,4-diol also obtained by the acid hydrolysis of the 3,4-epoxybutene-1 was treated with concentrated hydrochloric acid and anhydrous cuprous chloride in the same manner as described in Example II for the erythrol. A similar high yield of the 1,4-dichlorobutene-2 compound was obtained.

The 1,4-dichlorobutene-2 obtained in accordance with the method of this invention as has been described can be hydrolyzed to the 1,4-diol compound which in turn upon dehydration with ring closure is converted to furan. Alternatively the 3,4-dichlorobutene-2 can be converted with a cyanide to the dinitrile which upon reduction, i.e. hydrogenation, gives a diamine having 6 carbon atoms useful in producing nylon 6. The dinitrile also can be converted by conventional means such as by the use of an alcohol and acid to the unsaturated diester. All of these compounds are useful as monomers in the production of homopolymers or copolymers in accordance with well known methods.

We claim:

1. A process for the preparation of 1,4-dichlorobutene-2 which comprises reacting at ambient temperatures 3,4-epoxybutene-1 with a catalytic amount of anhydrous cuprous chloride and at least 2 moles of hydrochloric acid per mole of said 3,4-epoxybutene-1 to produce a mixture of the dichlorobutenes and recovering the 1,4-dichlorobutene-2.

2. The method according to claim 1 wherein the hydrochloric acid is a concentrated solution and the cuprous chloride ranges between 0.01 gram to 2 grams per 100 ml. of said hydrochloric acid solution.

3. The method according to claim 1 wherein the reaction is carried out at a temperature in the range of from —5° C. to 30° C.

4. The method according to claim 1 wherein the 3,4-epoxybutene-1 is added to said cuprous chloride and hydrochloric acid at a temperature below ambient temperature down to —5° C. and after the addition is completed the reaction is completed at ambient temperatures.

5. The method according to claim 1 wherein said hydrochloric acid is a concentrated solution, the mole ratio of the hydrogen chloride in said solution to said 3,4-epoxybutene-1 is in the range of from 2:1 to 10:1 and the reaction is carried out at a temperature of from —5° C. to 30° C.

6. The method according to claim 5 wherein said mole ratio is 3:1 to 6:1 and the temperature is in the range of from 0° C. to 25° C.

References Cited

A.P.C., S.N. 334,582, Trieschmann et al., June 8, 1943, 260–657.

LEON ZITVER, Primary Examiner

A. M. SIEGEL, Assistant Examiner

U.S. Cl. X.R.

260—635 E, 636